United States Patent
Tanaka

(10) Patent No.: US 9,945,312 B2
(45) Date of Patent: Apr. 17, 2018

(54) ABNORMALITY DIAGNOSIS DEVICE FOR EXHAUST GAS SENSOR

(71) Applicant: DENSO CORPORATION, Kariya, Aichi-pref. (JP)

(72) Inventor: Kou Tanaka, Obu (JP)

(73) Assignee: DENSO CORPORATION, Kariya (JP)

( * ) Notice: Subject to any disclaimer, the term of this patent is extended or adjusted under 35 U.S.C. 154(b) by 297 days.

(21) Appl. No.: 14/521,541

(22) Filed: Oct. 23, 2014

(65) Prior Publication Data

US 2015/0122003 A1    May 7, 2015

(30) Foreign Application Priority Data

Nov. 4, 2013  (JP) .................................. 2013-228900

(51) Int. Cl.
*F02D 41/14* (2006.01)
*G01M 15/10* (2006.01)
*F02D 41/24* (2006.01)

(52) U.S. Cl.
CPC ..... *F02D 41/1495* (2013.01); *F02D 41/1408* (2013.01); *F02D 41/1454* (2013.01); *F02D 41/1476* (2013.01); *F02D 41/2458* (2013.01); *G01M 15/102* (2013.01)

(58) Field of Classification Search
CPC ............. F02D 41/1495; F02D 41/1454; F02D 41/1408; F02D 41/1476; F02D 41/2458; G01M 15/10; G01M 15/102
USPC ...................................................... 73/114.72
See application file for complete search history.

(56) References Cited

U.S. PATENT DOCUMENTS

| | | | | |
|---|---|---|---|---|
| 5,251,604 A | * | 10/1993 | Kaneko | F02D 41/1495 123/688 |
| 5,610,321 A | * | 3/1997 | Shinmoto | F02D 41/1441 60/277 |
| 2004/0226282 A1 | * | 11/2004 | Hattori | F02D 41/0295 60/285 |
| 2013/0192211 A1 | * | 8/2013 | Nakano | F01N 9/005 60/276 |
| 2014/0067235 A1 | * | 3/2014 | Banker | F01N 11/007 701/104 |

(Continued)

FOREIGN PATENT DOCUMENTS

| | | | | |
|---|---|---|---|---|
| DE | 102011083781 B3 | * | 5/2012 | ......... F02D 41/0085 |
| JP | 2006-322426 | | 11/2006 | |
| JP | 2008274823 A | * | 11/2008 | |

*Primary Examiner* — Natalie Huls
*Assistant Examiner* — Monica S Young
(74) *Attorney, Agent, or Firm* — Nixon & Vanderhye PC

(57) ABSTRACT

An abnormality diagnosis device is for an exhaust gas sensor that detects an air-fuel ratio, or a rich or lean state of exhaust gas from an internal combustion engine and that includes a sensor element having a catalyst layer. The device includes an abnormality diagnosis unit that makes a sensor abnormality diagnosis whereby to change the air-fuel ratio alternately between a rich side and a lean side and to determine whether the exhaust gas sensor is abnormal or not based on response characteristics of the exhaust gas sensor in response to the change of the air-fuel ratio. When making the sensor abnormality diagnosis, the abnormality diagnosis unit calculates the response characteristics of the exhaust gas sensor with exclusion of a sensor output plateau region, which is a region in which an output of the exhaust gas sensor is stagnant due to the catalyst layer.

16 Claims, 8 Drawing Sheets

(56) References Cited

U.S. PATENT DOCUMENTS

2014/0326227 A1* 11/2014 Eser .................. F02D 41/0085
123/673

* cited by examiner

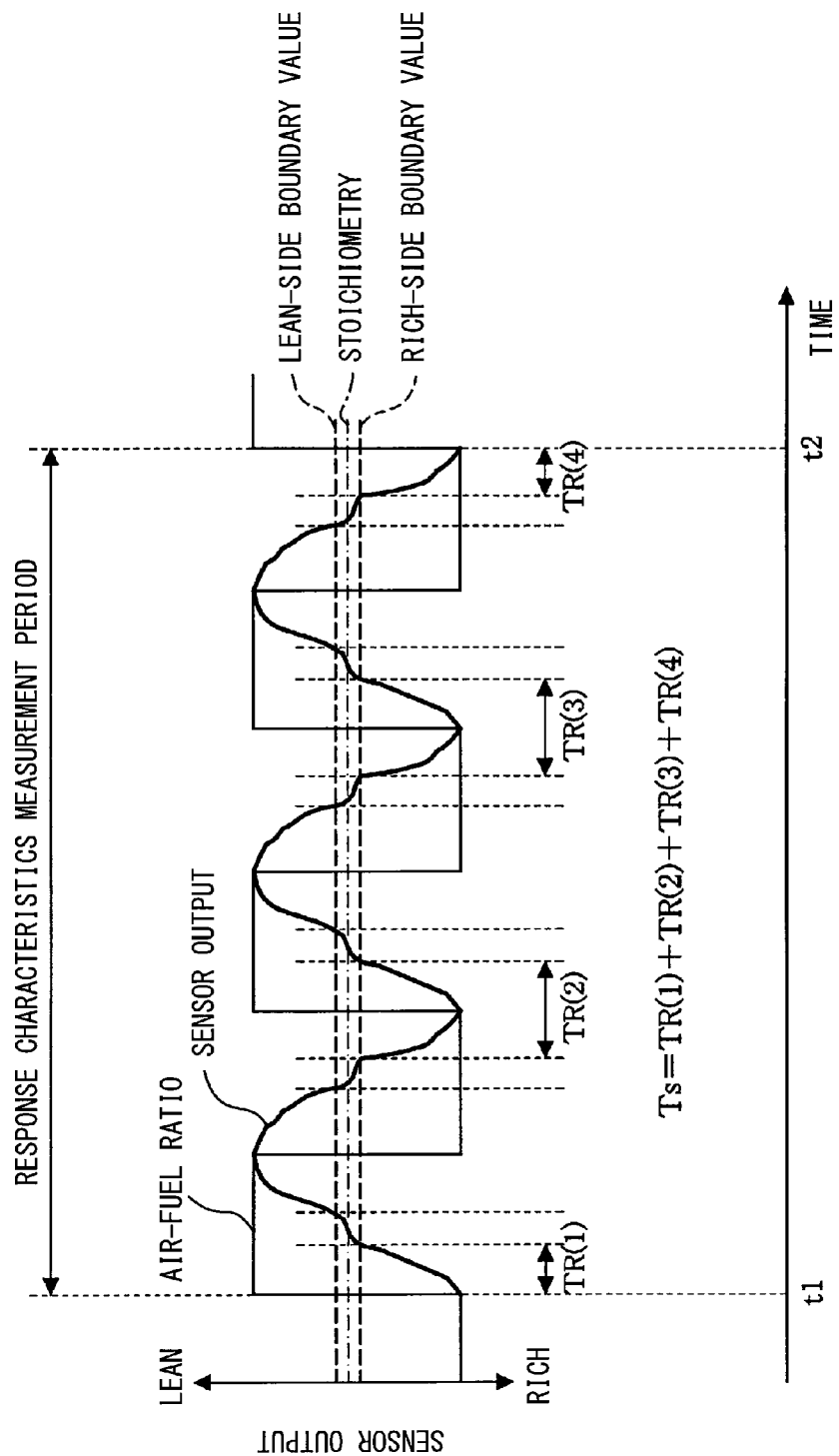

ABNORMALITY DIAGNOSIS DEVICE FOR EXHAUST GAS SENSOR

CROSS REFERENCE TO RELATED APPLICATION

This application is based on Japanese Patent Application No. 2013-228900 filed on Nov. 4, 2013, the disclosure of which is incorporated herein by reference.

TECHNICAL FIELD

The present disclosure relates to an abnormality diagnosis device for an exhaust gas sensor, which performs abnormality diagnosis on the exhaust gas sensor based on response characteristics of the exhaust gas sensor.

BACKGROUND

Recent years, in a vehicle including an internal combustion engine, a catalyst for exhaust gas purification is disposed in an exhaust pipe, and an exhaust gas sensor (air-fuel ratio sensor or oxygen sensor) for detecting an air-fuel ratio or rich/lean state of exhaust gas is disposed on an upstream side of this catalyst or both on upstream and downstream sides of the catalyst. The air-fuel ratio is feedback controlled based on the output of this exhaust gas sensor to increase an exhaust gas purification rate by the catalyst.

In such an exhaust gas purifying system, abnormality of the exhaust gas sensor needs to be diagnosed to prevent continued operation in a state where the exhaust gas sensor deteriorates and accuracy in control of the air-fuel ratio is reduced (state in which exhaust gas purification efficiency is lowered).

As an abnormality diagnostic technique for the exhaust gas sensor (e.g., air-fuel ratio sensor), there is, for example, a technique described in JP-A-2006-322426. This technique changes an air-fuel ratio forcibly, and determines normality/abnormality of the exhaust gas sensor based on a response time of the exhaust gas sensor with respect to the change of the air-fuel ratio.

The exhaust gas sensor has characteristics that the output of the exhaust gas sensor stagnates (change speed of the output is slowed down) in stoiciometry vicinity (stoiciometry and its vicinity) due to a catalyst layer which is one of components of a sensor element.

However, according to the art in the above publication of JP-A-2006-322426, a region in which the output of the exhaust gas sensor stagnates because of the catalyst layer (hereinafter referred to as a "sensor output plateau region") is not taken into consideration at all. Consequently, an influence of the sensor output plateau region may be included in the response time of the exhaust gas sensor. If the influence of the sensor output plateau region is included in the response time of the exhaust gas sensor, responsivity of the exhaust gas sensor cannot be accurately evaluated, and accuracy in detection of deterioration of the exhaust gas sensor responsivity may be reduced.

SUMMARY

The present disclosure addresses at least one of the above issues. Thus, it is an objective of the present disclosure to provide an abnormality diagnosis device for an exhaust gas sensor that can accurately evaluate responsivity of an exhaust gas sensor and can improve accuracy in detection of deterioration of the exhaust gas sensor responsivity.

To achieve the objective of the present disclosure, there is provided an abnormality diagnosis device for an exhaust gas sensor that detects an air-fuel ratio, or a rich or lean state of exhaust gas from an internal combustion engine and that includes a sensor element having a catalyst layer. The device includes an abnormality diagnosis unit that makes a sensor abnormality diagnosis whereby to change the air-fuel ratio alternately between a rich side and a lean side and to determine whether the exhaust gas sensor is abnormal or not based on response characteristics of the exhaust gas sensor in response to the change of the air-fuel ratio. When making the sensor abnormality diagnosis, the abnormality diagnosis unit calculates the response characteristics of the exhaust gas sensor with exclusion of a sensor output plateau region, which is a region in which an output of the exhaust gas sensor is stagnant due to the catalyst layer.

BRIEF DESCRIPTION OF THE DRAWINGS

The above and other objects, features and advantages of the present disclosure will become more apparent from the following detailed description made with reference to the accompanying drawings. In the drawings:

FIG. 8 is a diagram illustrating a method for calculating a response time of an exhaust gas sensor in accordance with a third embodiment.

DETAILED DESCRIPTION

Figure 1:
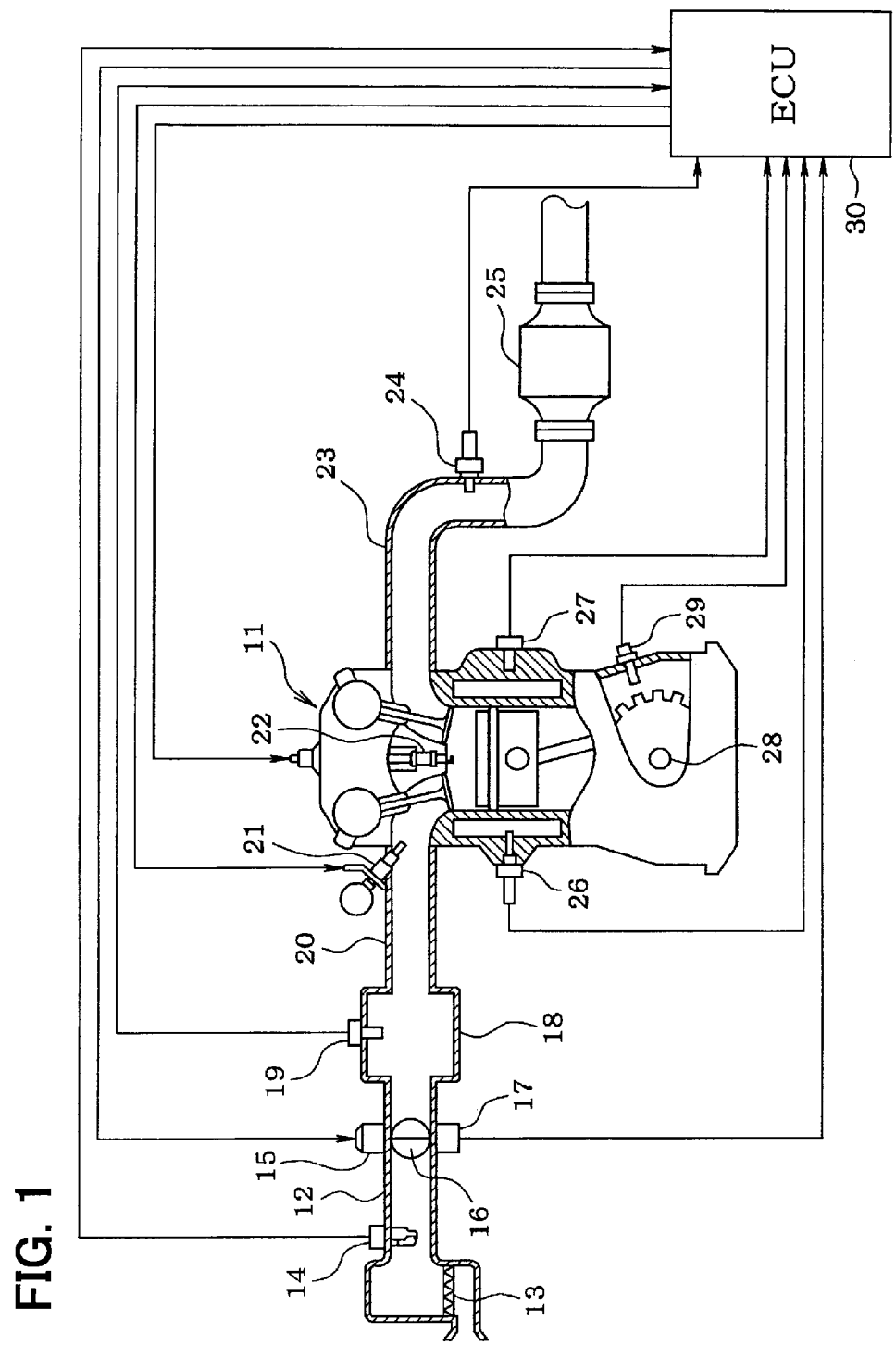
FIG. 1 is a diagram illustrating a schematic configuration of an engine control system in accordance with a first embodiment.

Embodiments of the present disclosure will be described below.

First Embodiment

A first embodiment will be described with reference to FIGS. 1 to 6. First, a schematic configuration of an engine control system will be explained with reference to FIG. 1. An air cleaner 13 is provided at an uppermoststream part of an intake pipe 12 of an engine 11 which is an internal combustion engine. An air flow meter 14 for detecting an intake air amount is provided on a downstream side of this air cleaner 13. On a downstream side of this air flow meter 14, there are provided a throttle valve 16 whose opening degree is regulated by a motor 15, and a throttle opening degree sensor 17 for detecting the opening degree of this throttle valve 16 (throttle opening degree).

Moreover, a surge tank 18 is provided on a downstream side of the throttle valve 16, and an intake pipe pressure sensor 19 for detecting intake pipe pressure is provided at this surge tank 18. Furthermore, an intake manifold 20 for introducing air into each cylinder of the engine 11 is provided for the surge tank 18. A fuel injection valve 21 for injecting fuel into its corresponding intake port is attached to the intake port connected to the intake manifold 20 of each cylinder or to its vicinity. In addition, an ignition plug 22 is attached to a cylinder head of the engine 11 for each cylinder, and the air-fuel mixture in each cylinder is ignited by a spark discharge of the ignition plug 22 for each cylinder.

On the other hand, at an exhaust pipe 23 of the engine 11, there is provided an exhaust gas sensor 24 (e.g., air-fuel ratio sensor or oxygen sensor) for detecting an air-fuel ratio or rich/lean state of exhaust gas. A catalyst 25 such as a three-way catalyst for purifying exhaust gas is provided on a downstream side of this exhaust gas sensor 24. For example, the exhaust gas sensor 24 is an air-fuel ratio sensor for outputting a linear air-fuel ratio signal according to the air-fuel ratio of exhaust gas, or an oxygen sensor whose output voltage is reversed depending on whether the air-fuel ratio of exhaust gas is rich or lean relative to stoiciometry (theoretical air-fuel ratio).

Figure 2:
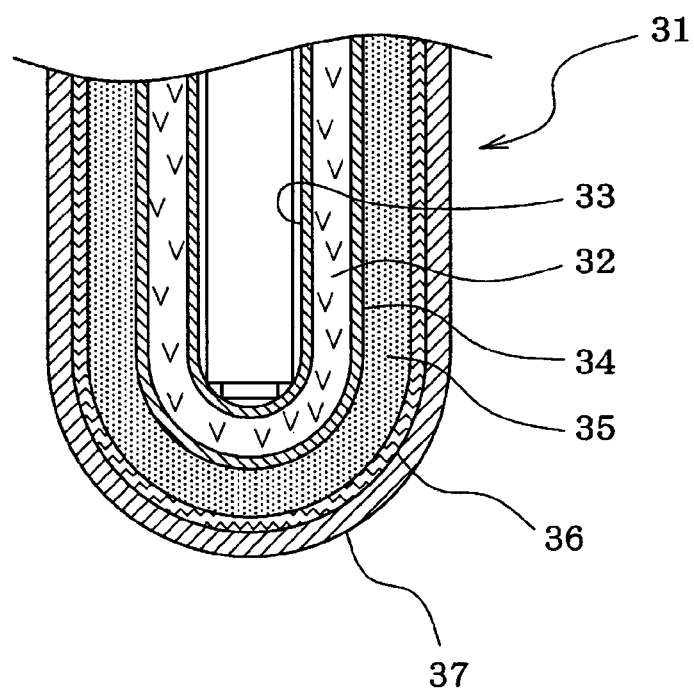
FIG. 2 is a sectional view illustrating a schematic configuration of a sensor element according to the first embodiment.

As illustrated in FIG. 2, the exhaust gas sensor 24 includes a sensor element 31 having a cup-shaped structure. This sensor element 31 is accommodated in a housing or element cover which is not shown, and is disposed in the exhaust pipe 23 of the engine 11. In the sensor element 31, an atmosphere-side electrode 33 is provided on an inner surface of a solid electrolyte body 32 which is formed nearly in a cup-shape, and an exhaust-side electrode 34 is provided on an outer surface of the solid electrolyte body 32. Furthermore, a coating layer 35 for protecting the exhaust-side electrode 34 is provided on an outer surface of the exhaust-side electrode 34. In addition, a catalyst layer 36 that supports a catalyst component is provided on an outer surface of the coating layer 35, and a trap layer 37 for preventing the poisoning of the catalyst is provided on an outer surface of the catalyst layer 36.

As illustrated in FIG. 1, a coolant temperature sensor 26 for detecting coolant temperature, and a knock sensor 27 for detecting a knocking are attached to a cylinder block of the engine 11. Moreover, a crank angle sensor 29 for outputting a pulse signal every time a crankshaft 28 rotates by a predetermined crank angle is attached on an outer peripheral side of the crankshaft 28. The crank angle and engine rotation speed are detected based on the output signal from this crank angle sensor 29.

The outputs from these various sensors are inputted into an electronic control unit (hereinafter referred to as an "ECU") 30. This ECU 30 is configured mainly by a microcomputer, and controls the fuel injection amount, ignition timing, throttle opening degree (intake air amount) and so forth according to an engine operating condition through execution of various programs for engine control stored in an integrated ROM (storage medium).

In this case, when a predetermined air-fuel ratio feedback control execution condition is satisfied, the ECU 30 performs air-fuel ratio feedback control whereby to feedback control an air-fuel ratio of the air-fuel mixture (fuel injection amount and intake air amount) such that an air-fuel ratio of exhaust gas reaches a target air-fuel ratio based on the output of the exhaust gas sensor 24.

Figure 4:
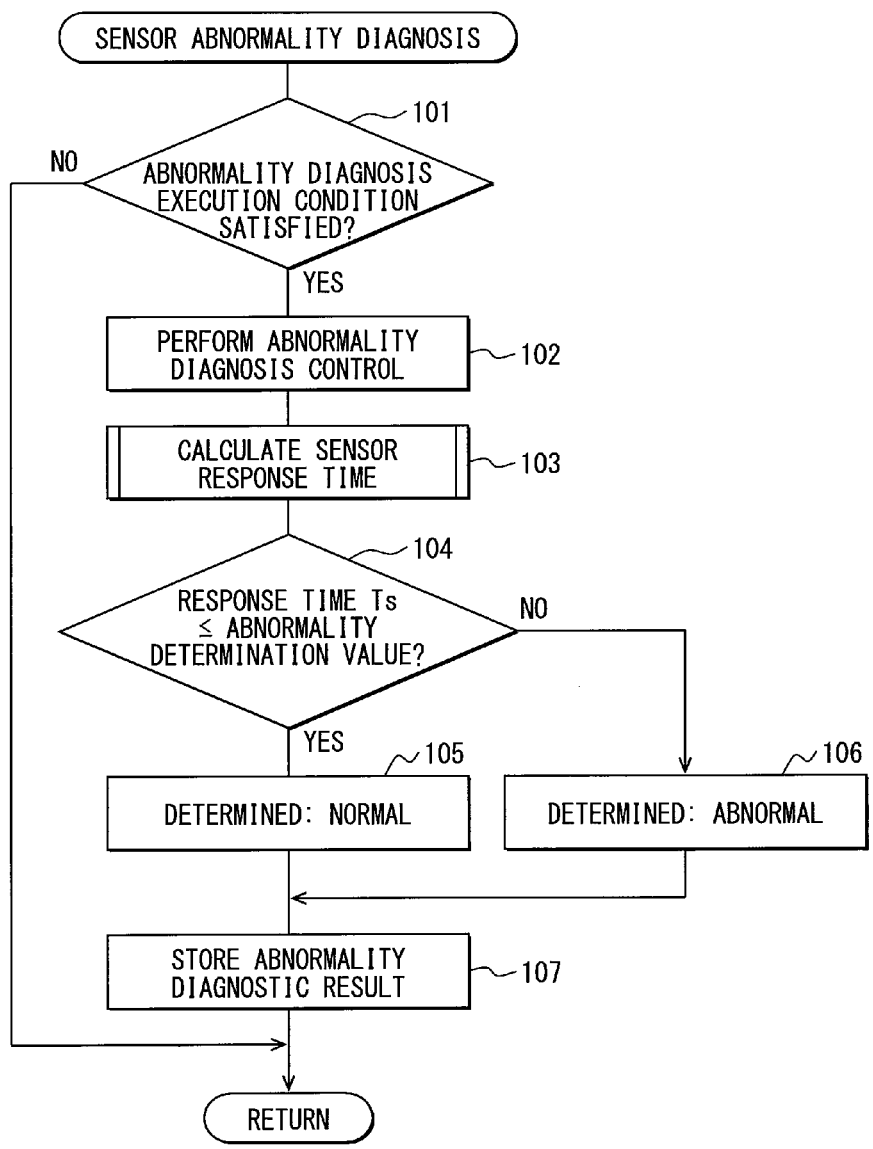
FIG. 4 is a flow chart illustrating a flow of processing of a sensor abnormality diagnosis routine according to the first embodiment.

Furthermore, through execution of routines for sensor abnormality diagnosis in FIGS. 4 and 5 described later, the ECU 30 makes a sensor abnormality diagnosis when a predetermined abnormality diagnosis execution condition is satisfied. By this sensor abnormality diagnosis, the air-fuel ratio of exhaust gas is forcibly changed alternately between a rich side and a lean side, and a response time (response characteristics) of the exhaust gas sensor 24 in response to this change of the air-fuel ratio is calculated. Based on this response time of the exhaust gas sensor 24, it is determined whether the exhaust gas sensor 24 is abnormal (responsivity deterioration) or not.

Figure 3:
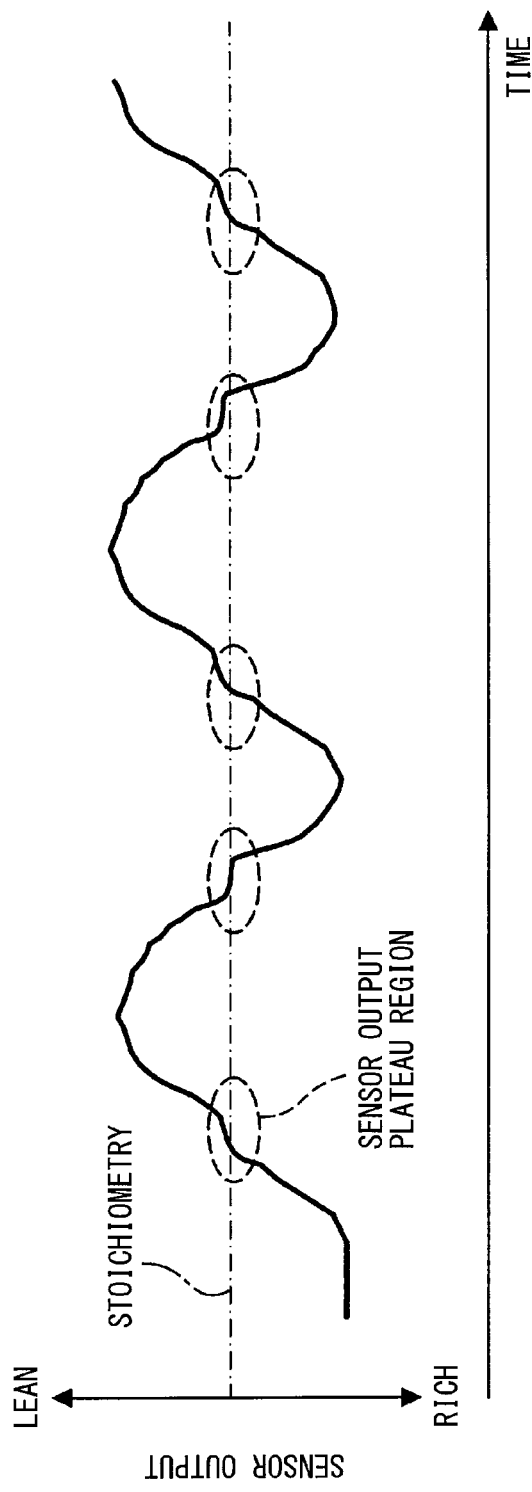
FIG. 3 is a diagram illustrating a sensor output plateau region according to the first embodiment.

As illustrated in FIG. 3, the exhaust gas sensor 24 has characteristics that the output of the exhaust gas sensor 24 stagnates (change speed of the output is slowed down) in stoiciometry vicinity (stoiciometry and its vicinity) due to the catalyst layer 36 of the sensor element 31.

Accordingly, when making the sensor abnormality diagnosis, if a region in which the output of the exhaust gas sensor 24 is stagnant because of the catalyst layer 36 (hereinafter referred to as a "sensor output plateau region") is not considered, an influence of the sensor output plateau region may be included in the response time of the exhaust gas sensor 24. If the influence of the sensor output plateau region is included in the response time of the exhaust gas sensor 24, the responsivity of the exhaust gas sensor 24 cannot be accurately evaluated, so that accuracy in detection of responsivity deterioration of the exhaust gas sensor 24 may be reduced.

As a measure against this, when making the sensor abnormality diagnosis, the ECU 30 calculates the response time of the exhaust gas sensor 24 with the exclusion of the sensor output plateau region (region in which the output of the exhaust gas sensor 24 is stagnant due to the catalyst layer 36). In the present first embodiment, the response time of the exhaust gas sensor 24 is calculated in a lean-side region and a rich-side region from the sensor output plateau region (i.e., region except the sensor output plateau region).

Accordingly, the response time of the exhaust gas sensor 24 with respect to the change of the air-fuel ratio can accurately be obtained without the influence of the sensor output plateau region. By use of this accurately-obtained response time of the exhaust gas sensor 24, it can be determined whether the exhaust gas sensor 24 is abnormal or not. In the following description, there will be explained the processing of the routines for sensor abnormality diagnosis in FIGS. 4 and 5 executed by the ECU 30 in the present first embodiment.

The sensor abnormality diagnosis routine will be described below. The sensor abnormality diagnosis routine illustrated in FIG. 4 is performed repeatedly with a predetermined period while the ECU 30 is turned on (while an ignition switch is turned on) and serves as an "abnormality diagnosis unit".

When this routine is activated, first, it is determined at step 101 whether a predetermined abnormality diagnosis execution condition is satisfied. The abnormality diagnosis execution condition may include, for example, that the exhaust gas sensor 24 is activated, and that the engine 11 is in a steady operation state. If all of these conditions are met, the abnormality diagnosis execution condition is satisfied. However, if any one of these conditions is not met, the abnormality diagnosis execution condition is not satisfied. If it is determined at this step 101 that the abnormality diagnosis execution condition is not satisfied, this routine is ended without carrying out the processing relating to abnormality diagnosis at or after step 102.

On the other hand, if it is determined at the above step 101 that the abnormality diagnosis execution condition is satisfied, the processing relating to abnormality diagnosis at and after step 102 is carried out as follows. First, at step 102, control for abnormality diagnosis is executed. By this abnormality diagnosis control, the air-fuel ratio of the air-fuel mixture is forcibly changed alternately between the rich side and the lean side from stoichiometry so as to forcibly change the air-fuel ratio of exhaust gas alternately between the rich side and the lean side of stoichiometry.

Figure 6:
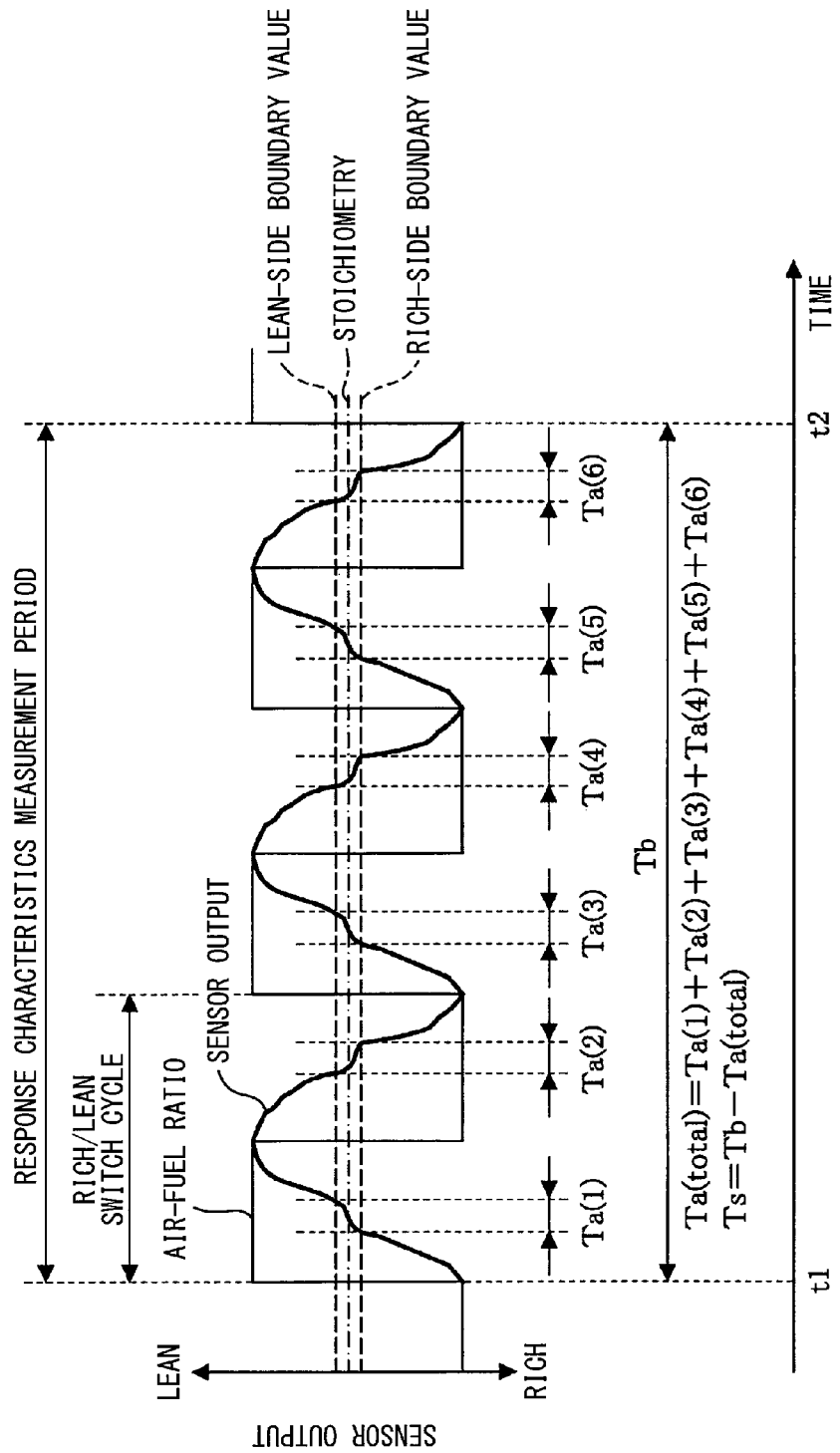
FIG. 6 is a diagram illustrating a method for calculating a response time of an exhaust gas sensor according to the first embodiment.

Specifically, as illustrated in FIG. 6, the air-fuel ratio of the air-fuel mixture is changed in a stepwise manner from a rich-side target value to a lean-side target value. After that, at the point that the output of the exhaust gas sensor 24 (detected air-fuel ratio) reaches the lean-side target value, the air-fuel ratio of the air-fuel mixture is changed in a stepwise manner from the lean-side target value to the rich-side target value. Then, at the point that the output of the exhaust gas sensor 24 reaches the rich-side target value, the air-fuel ratio of the air-fuel mixture is changed in a stepwise manner from the rich-side target value to the lean-side target value. Such a rich/lean switch cycle is carried out once or multiple times repeatedly. In addition, during the air-fuel ratio feedback control, the target air-fuel ratio of exhaust gas may be changed to change the air-fuel ratio of the air-fuel mixture.

Figure 5:
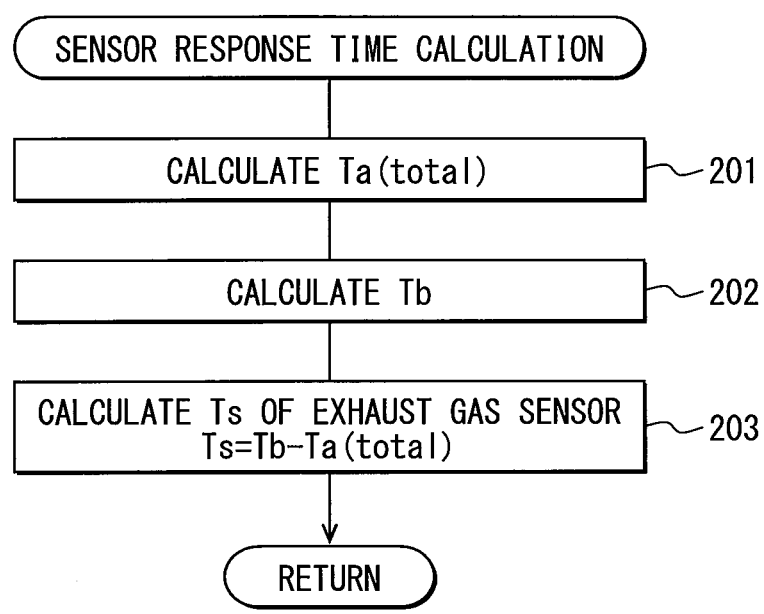
FIG. 5 is a flow chart illustrating a flow of processing of a sensor response time calculation routine according to the first embodiment.

Following this, control proceeds to step 103 where an after-mentioned sensor response time calculation routine in FIG. 5 is performed. Accordingly, a response time Ts of the exhaust gas sensor 24 is calculated with the exception of the sensor output plateau region (region in which the output of the exhaust gas sensor 24 is stagnant due to the catalyst layer 36) while the abnormality diagnosis control is in execution.

Subsequently, control proceeds to step 104 where it is determined whether the response time Ts of the exhaust gas sensor 24 is equal to or smaller than a predetermined abnormality determination value. This abnormality determination value is set, for example, based on the number of the rich/lean switch cycles.

If it is determined at this step 104 that the response time is of the exhaust gas sensor 24 is the abnormality determination value or smaller, control proceeds to step 105 where it is determined that the exhaust gas sensor 24 is not abnormal (normal) to maintain an abnormality flag at OFF.

On the other hand, if it is determined that the response time Ts of the exhaust gas sensor 24 is larger than the abnormality determination value, control proceeds to step 106 where it is determined that the exhaust gas sensor 24 is abnormal (responsivity deterioration) to set the abnormality flag at ON.

After it is determined whether the exhaust gas sensor 24 is abnormal or not in this manner, control proceeds to step 107 where the abnormality diagnostic result (abnormality flag) is stored in a rewritable non-volatile memory (rewritable memory which holds stored data even while the ECU 30 is turned off) such as a backup RAM (not shown) of the ECU 30, and ends this routine.

The sensor response time calculation routine will be described below. The sensor response time calculation routine illustrated in FIG. 5 is a subroutine executed at step 103 in the above-described sensor abnormality diagnosis routine in FIG. 4.

When this routine is activated, first, at step 201, each time the output of the exhaust gas sensor 24 passes through the sensor output plateau region during a predetermined response characteristics measurement period, a time required for the output of the exhaust gas sensor 24 to pass through the sensor output plateau region (time in which the output of the exhaust gas sensor 24 is determined to be within the sensor output plateau region) is calculated as a sensor output plateau time Ta. The response characteristics measurement period (see FIG. 6) is a period in which the rich/lean switch cycle is performed repeatedly N times. Then, a sensor output plateau time total value Ta(total) is obtained by summing up the sensor output plateau times Ta calculated during the response characteristics measurement period.

For example, as illustrated in FIG. 6, if the sensor output plateau time Ta is calculated six times (N=3) in the response characteristics measurement period, the sensor output plateau time total value Ta(total) is obtained by summing up the six sensor output plateau times Ta(1) to Ta(6).

$$Ta(total)=Ta(1)+Ta(2)+Ta(3)+Ta(4)+Ta(5)+Ta(6)$$

In addition, the determination of whether or not the output of the exhaust gas sensor 24 is within the sensor output plateau region is made, for example, as follows. When the output of the exhaust gas sensor 24 is in a range from a rich-side boundary value to a lean-side boundary value of the sensor output plateau region, the output of the exhaust gas sensor 24 is determined to be within the sensor output plateau region. Or, when the output of the exhaust gas sensor 24 passes through the stoiciometry vicinity, if an absolute value of the amount of change of the output of the exhaust gas sensor 24 (e.g., difference between the present value and the previous value) is a predetermined value or smaller, the output of the exhaust gas sensor 24 is determined to be within the sensor output plateau region.

After this, control proceeds to step 202 where a length of the response characteristics measurement period (time from a point t1 at which the air-fuel ratio is changed first time in a stepwise manner from the rich-side target value to the lean-side target value to a point t2 at which the output of the exhaust gas sensor 24 reaches the rich-side target value last time) is calculated as a response characteristics measurement time Tb.

Then, control proceeds to step 203 where the response time Ts of the exhaust gas sensor 24 is obtained by subtracting the sensor output plateau time total value Ta(total) from the response characteristics measurement time Tb.

$$Ts=Tb-Ta(total)$$

In this manner, the response time Ts of the exhaust gas sensor 24 is obtained in the lean-side region and the rich-side region from the sensor output plateau region (i.e., region except the sensor output plateau region).

In the above-described present first embodiment, there is made the sensor abnormality diagnosis whereby the air-fuel ratio of exhaust gas is forcibly changed alternately between the rich side and the lean side, and the response time of the exhaust gas sensor 24 in response to this change of the air-fuel ratio is calculated; and based on this response time of the exhaust gas sensor 24, it is determined whether the exhaust gas sensor 24 is abnormal (responsivity deterioration) or not. When performing this sensor abnormality diagnosis, the response time of the exhaust gas sensor 24 is calculated in the lean-side region and the rich-side region from the sensor output plateau region (i.e., region except the sensor output plateau region).

Accordingly, the response time of the exhaust gas sensor 24 with respect to the change of the air-fuel ratio can accurately be obtained without the influence of the sensor output plateau region. By use of this accurately-obtained response time of the exhaust gas sensor 24, it can be determined whether the exhaust gas sensor 24 is abnormal or not. As a result, without the influence of the sensor output plateau region, the responsivity of the exhaust gas sensor 24 is accurately evaluated so that it can accurately be determined whether the exhaust gas sensor 24 is abnormal (responsivity deterioration) or not. Consequently, the accuracy in detection of responsivity deterioration of the exhaust gas sensor 24 can be improved.

Second Embodiment

A second embodiment will be described with reference to FIG. 7. Descriptions of substantially the same components as in the above first embodiment are omitted or simplified, and components different from the first embodiment will mainly be explained.

In the present second embodiment, when performing sensor abnormality diagnosis, a response time of an exhaust gas sensor 24 is calculated in a lean-side region from a sensor output plateau region.

Figure 7:
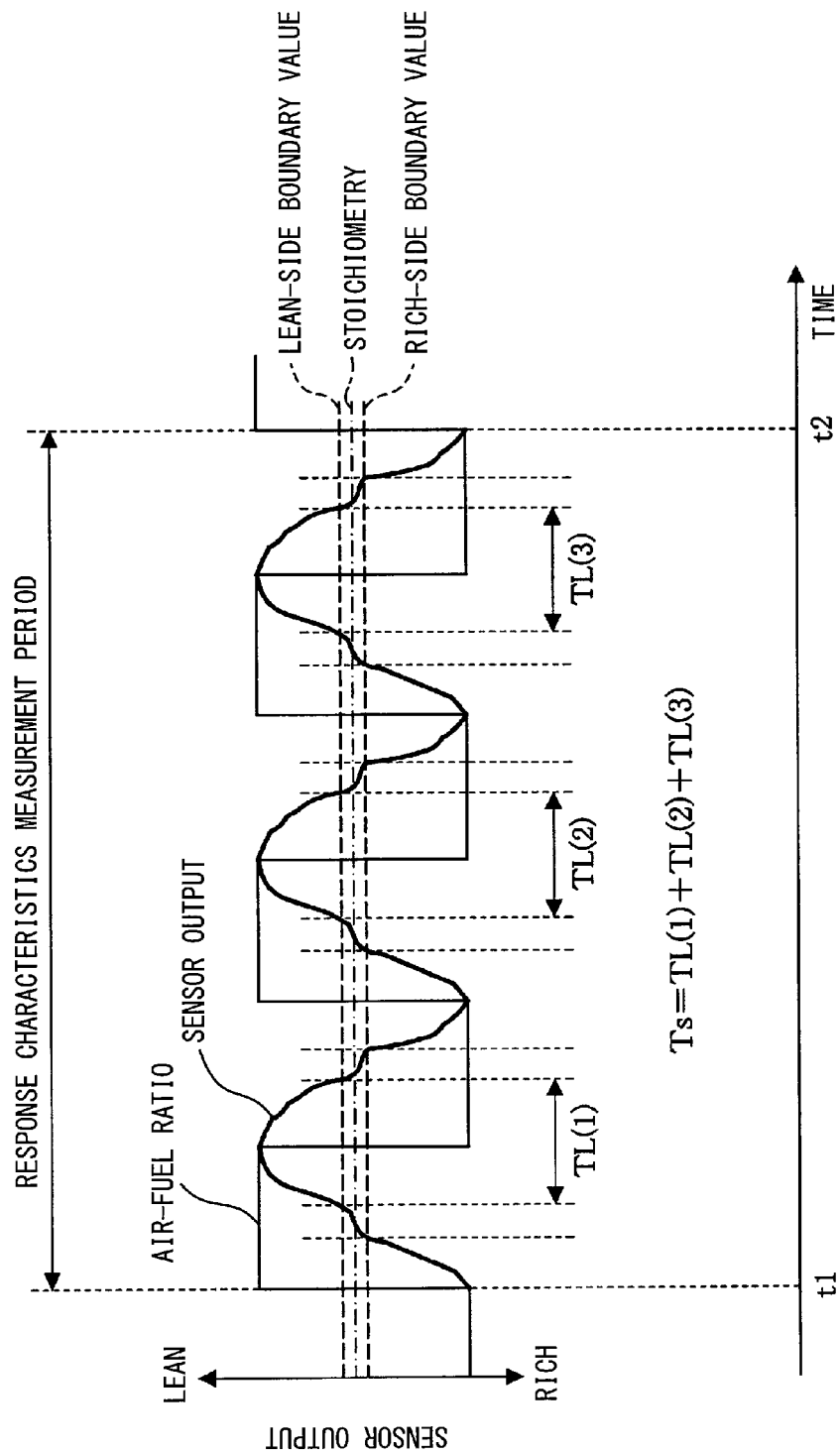
FIG. 7 is a diagram illustrating a method for calculating a response time of an exhaust gas sensor in accordance with a second embodiment.

Specifically, as illustrated in FIG. 7, every time output of the exhaust gas sensor 24 is within the lean-side region from the sensor output plateau region during a response characteristics measurement period, a time in which the output of the exhaust gas sensor 24 is determined to be within the lean-side region from the sensor output plateau region is calculated as a lean-side transit time TL. Then, the lean-side transit times TL calculated in the response characteristics measurement period are summed up to obtain a response time Ts of the exhaust gas sensor 24.

For example, as illustrated in FIG. 7, when the lean-side transit time TL is calculated three times in the response characteristics measurement period, the three lean-side transit times TL(1) to TL(3) are summed up to obtain the response time Ts of the exhaust gas sensor 24.

$$Ts=TL(1)+TL(2)+TL(3)$$

In this manner, the response time Ts of the exhaust gas sensor 24 is obtained in the lean-side region from the sensor output plateau region.

In the above-described present second embodiment, at the time of the sensor abnormality diagnosis, the response time of the exhaust gas sensor 24 is calculated in the lean-side region from the sensor output plateau region. By this means as well, the response time of the exhaust gas sensor 24 with respect to the change of the air-fuel ratio can accurately be obtained without the influence of the sensor output plateau region, and substantially the same effects as the above first embodiment can be produced.

Third Embodiment

A third embodiment will be described with reference to FIG. 8. Descriptions of substantially the same components as in the above first embodiment are omitted or simplified, and components different from the first embodiment will mainly be explained. In the present third embodiment, when performing sensor abnormality diagnosis, a response time of an exhaust gas sensor 24 is calculated in a rich-side region from a sensor output plateau region.

Specifically, as illustrated in FIG. 8, every time output of the exhaust gas sensor 24 is within the rich-side region from the sensor output plateau region during a response characteristics measurement period, a time in which the output of the exhaust gas sensor 24 is determined to be within the rich-side region from the sensor output plateau region is calculated as a rich-side transit time TR. Then, the rich-side transit times TR calculated in the response characteristics measurement period are summed up to obtain a response time Ts of the exhaust gas sensor 24.

For example, as illustrated in FIG. 8, when the rich-side transit time TR is calculated four times in the response characteristics measurement period, the four rich-side transit times TR(1) to TR(4) are summed up to obtain the response time Ts of the exhaust gas sensor 24.

$$Ts=TR(1)+TR(2)+TR(3)+TR(4)$$

In this manner, the response time Ts of the exhaust gas sensor 24 is obtained in the rich-side region from the sensor output plateau region.

In the above-described present third embodiment, at the time of the sensor abnormality diagnosis, the response time of the exhaust gas sensor 24 is calculated in the rich-side region from the sensor output plateau region. By this means as well, the response time of the exhaust gas sensor 24 with respect to the change of the air-fuel ratio can accurately be obtained without the influence of the sensor output plateau region, and substantially the same effects as the above first embodiment can be produced.

The present disclosure may be practiced by combination of two or three of the first to third embodiments. Specifically, it may be determined whether the exhaust gas sensor 24 is abnormal or not by use of two or three of the response time of the exhaust gas sensor 24 calculated in the lean-side region and the rich-side region from the sensor output plateau region, the response time of the exhaust gas sensor 24 calculated in the lean-side region from the sensor output plateau region, and the response time of the exhaust gas sensor 24 calculated in the rich-side region from the sensor output plateau region.

In the above-described embodiments, the response time of the exhaust gas sensor 24 is calculated as the response characteristics of the exhaust gas sensor 24. However, instead of this, for example, a change rate, or change amount per a predetermined time of the output of the exhaust gas sensor 24 may be calculated as the response characteristics of the exhaust gas sensor 24.

Moreover, the response characteristics (e.g., response time, change rate, change amount) when the output of the exhaust gas sensor 24 changes from the rich state to the lean state, or the response characteristics when the output of the exhaust gas sensor 24 changes from the lean state to the rich state may be calculated.

Furthermore, in the above-described embodiments, the present disclosure is applied to the system with the use of the exhaust gas sensor 24 including the sensor element 31 having a cup-shaped structure. However, instead of this, for example, the present disclosure may be applied to a system with the use of an exhaust gas sensor including a sensor element having a layered-type structure.

In addition, the present disclosure is not limited to the intake port injection type engine illustrated in FIG. 1. The present disclosure can also be practiced through application to an in-cylinder injection type engine, or a dual injection type engine including both a fuel injection valve for intake port injection and a fuel injection valve for in-cylinder injection.

To sum up, the abnormality diagnosis device for the exhaust gas sensor 24 of the above embodiments can be described as follows.

An abnormality diagnosis device is for an exhaust gas sensor 24 that detects an air-fuel ratio, or a rich or lean state of exhaust gas from an internal combustion engine 11 and that includes a sensor element 31 having a catalyst layer 36. The device includes an abnormality diagnosis unit 30 that makes a sensor abnormality diagnosis whereby to change the air-fuel ratio alternately between a rich side and a lean side and to determine whether the exhaust gas sensor 24 is abnormal or not based on response characteristics of the exhaust gas sensor 24 in response to the change of the air-fuel ratio. When making the sensor abnormality diagnosis, the abnormality diagnosis unit 30 calculates the response characteristics of the exhaust gas sensor 24 with exclusion of a sensor output plateau region, which is a region in which an output of the exhaust gas sensor 24 is stagnant due to the catalyst layer 36.

Accordingly, the response characteristics of the exhaust gas sensor 24 with respect to the change of the air-fuel ratio can accurately be obtained without the influence of the sensor output plateau region. By use of this accurately-obtained response characteristics of the exhaust gas sensor 24, it can be determined whether the exhaust gas sensor 24 is abnormal or not. As a result, without the influence of the sensor output plateau region, the responsivity of the exhaust gas sensor 24 is accurately evaluated so that it can accurately be determined whether the exhaust gas sensor 24 is abnormal (responsivity deterioration) or not. Consequently, the accuracy in detection of responsivity deterioration of the exhaust gas sensor 24 can be improved.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. An abnormality diagnosis device for an exhaust gas sensor that detects an air-fuel ratio, or a rich or lean state of exhaust gas from an internal combustion engine and that includes a sensor element having a catalyst layer, the device comprising:
    an abnormality diagnosis unit configured to make a sensor abnormality diagnosis, the abnormality diagnosis unit being configured to:
        change the air-fuel ratio alternately between a rich side and a lean side by controlling at least a throttle valve or a fuel injection valve; and
        determine whether the exhaust gas sensor is abnormal or not based on response characteristics of the exhaust gas sensor in response to the change of the air-fuel ratio, wherein:
    the abnormality diagnosis unit is further configured to, when making the sensor abnormality diagnosis, calculate the response characteristics of the exhaust gas sensor with exclusion of a sensor output plateau region, which is a characteristic region in which a change speed of an output of the exhaust gas sensor is slowed down and flattened in stoichiometry vicinity due to the catalyst layer; and
    the output of the exhaust gas sensor passes through the sensor output plateau region between the rich side and the lean side, which are adjacent to each other.

2. The abnormality diagnosis device according to claim 1, wherein the abnormality diagnosis unit is further configured to, when making the sensor abnormality diagnosis, calculate the response characteristics of the exhaust gas sensor in a lean-side region and a rich-side region from the sensor output plateau region.

3. The abnormality diagnosis device according to claim 2, further comprising a response characteristics calculation unit configured to, each time the output of the exhaust gas sensor passes through the sensor output plateau region during a predetermined response characteristics measurement period, calculate a time required for the output of the exhaust gas sensor to pass through the sensor output plateau region as a sensor output plateau time, wherein the response characteristics calculation unit is further configured to calculate the response characteristics of the exhaust gas sensor by subtracting a sensor output plateau time total value from a response characteristics measurement time.

4. The abnormality diagnosis device according to claim 2, wherein in the sensor output plateau region, the change speed of the output of the exhaust gas sensor is slower than in the lean-side region and the rich-side region from the sensor output plateau region.

5. The abnormality diagnosis device according to claim 1, wherein the abnormality diagnosis unit is further configured to, when making the sensor abnormality diagnosis, calculate the response characteristics of the exhaust gas sensor in a lean-side region from the sensor output plateau region.

6. The abnormality diagnosis device according to claim 5, further comprising a response characteristics calculation unit configured to, every time the output of the exhaust gas sensor is within the lean-side region from the sensor output plateau region during a response characteristics measurement period, calculate a time in which the output of the exhaust gas sensor is determined to be within the lean-side region from the sensor output plateau region, as a lean-side transit time, wherein the response characteristics calculation unit is further configured to calculate a response time of the exhaust gas sensor by summing up the lean-side transit time calculated during the response characteristics measurement period.

7. The abnormality diagnosis device according to claim 1, wherein the abnormality diagnosis unit is further configured to, when making the sensor abnormality diagnosis, calculate the response characteristics of the exhaust gas sensor in a rich-side region from the sensor output plateau region.

8. The abnormality diagnosis device according to claim 7, further comprising a response characteristics calculation unit configured to, every time the output of the exhaust gas sensor is within the rich-side region from the sensor output plateau region during a response characteristics measurement period, calculate a time in which the output of the exhaust gas sensor is determined to be within the rich-side region from the sensor output plateau region as a rich-side transit time, wherein the response characteristics calculation unit further configured to calculate a response time of the exhaust gas sensor by summing up the rich-side transit time calculated during the response characteristics measurement period.

9. An abnormality diagnosis device for an exhaust gas sensor that detects an air-fuel ratio, or a rich or lean state of exhaust gas from an internal combustion engine and that includes a sensor element having a protection layer configured to prevent specified gas from reaching an electrode portion of the sensor element, the device comprising:
    an abnormality diagnosis unit configured to make a sensor abnormality diagnosis, the abnormality diagnosis unit being configured to:
        change the air-fuel ratio alternately between a rich side and a lean side by controlling at least a throttle valve or a fuel injection valve; and determine whether the exhaust gas sensor is abnormal or not based on response characteristics of the exhaust gas sensor in response to the change of the air-fuel ratio, wherein:

the abnormality diagnosis unit is further configured to, when making the sensor abnormality diagnosis, calculate the response characteristics of the exhaust gas sensor with exclusion of a sensor output plateau region, which is a characteristic region in which a change speed of an output of the exhaust gas sensor is slowed down and flattened in stoichiometry vicinity due to the protection layer; and the output of the exhaust gas sensor passes through the sensor output plateau region between the rich side and the lean side, which are adjacent to each other.

10. The abnormality diagnosis device according to claim 9, wherein the abnormality diagnosis unit is further configured to, when making the sensor abnormality diagnosis, calculate the response characteristics of the exhaust gas sensor in a lean-side region and a rich-side region from the sensor output plateau region.

11. The abnormality diagnosis device according to claim 10, further comprising a response characteristics calculation unit configured to, each time the output of the exhaust gas sensor passes through the sensor output plateau region during a predetermined response characteristics measurement period, calculate a time required for the output of the exhaust gas sensor to pass through the sensor output plateau region as a sensor output plateau time, wherein the response characteristics calculation unit is further configured to calculate the response characteristics of the exhaust gas sensor by subtracting a sensor output plateau time total value from a response characteristics measurement time.

12. The abnormality diagnosis device according to claim 10, wherein in the sensor output plateau region, the change speed of the output of the exhaust gas sensor is slower than in the lean-side region and the rich-side region from the sensor output plateau region.

13. The abnormality diagnosis device according to claim 9, wherein the abnormality diagnosis unit is further configured to, when making the sensor abnormality diagnosis, calculate the response characteristics of the exhaust gas sensor in a lean-side region from the sensor output plateau region.

14. The abnormality diagnosis device according to claim 13, further comprising a response characteristics calculation unit configured to, every time the output of the exhaust gas sensor is within the lean-side region from the sensor output plateau region during a response characteristics measurement period, calculate a time in which the output of the exhaust gas sensor is determined to be within the lean-side region from the sensor output plateau region, as a lean-side transit time, wherein the response characteristics calculation unit is further configured to calculate a response time of the exhaust gas sensor by summing up the lean-side transit time calculated during the response characteristics measurement period.

15. The abnormality diagnosis device according to claim 9, wherein the abnormality diagnosis unit is further configured to, when making the sensor abnormality diagnosis, calculate the response characteristics of the exhaust gas sensor in a rich-side region from the sensor output plateau region.

16. The abnormality diagnosis device according to claim 15, further comprising a response characteristics calculation unit configured to, every time the output of the exhaust gas sensor is within the rich-side region from the sensor output plateau region during a response characteristics measurement period, calculate a time in which the output of the exhaust gas sensor is determined to be within the rich-side region from the sensor output plateau region as a rich-side transit time, wherein the response characteristics calculation unit further configured to calculate a response time of the exhaust gas sensor by summing up the rich-side transit time calculated during the response characteristics measurement period.

* * * * *